US011163132B2

(12) United States Patent
Kubota et al.

(10) Patent No.: US 11,163,132 B2
(45) Date of Patent: Nov. 2, 2021

(54) THERMAL BARRIER FILM, THERMAL BARRIER PAINT, AND OPTICAL INSTRUMENT

(71) Applicant: CANON KABUSHIKI KAISHA, Tokyo (JP)

(72) Inventors: Reiko Kubota, Yokohama (JP); Toshiaki Shingu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 458 days.

(21) Appl. No.: 15/481,707

(22) Filed: Apr. 7, 2017

(65) Prior Publication Data

US 2017/0299840 A1 Oct. 19, 2017

(30) Foreign Application Priority Data

Apr. 18, 2016 (JP) ............................ JP2016-082672
Apr. 22, 2016 (JP) ............................ JP2016-086144

(51) Int. Cl.
*G02B 7/02* (2006.01)
*G02B 5/20* (2006.01)
(Continued)

(52) U.S. Cl.
CPC ........... *G02B 7/028* (2013.01); *C08G 59/621* (2013.01); *C08L 63/04* (2013.01); *C09D 5/004* (2013.01);
(Continued)

(58) Field of Classification Search
CPC ...... G02B 1/14; G02B 5/0242; G02B 5/0284; G02B 5/206; G02B 5/208; G02B 5/26;
(Continued)

(56) References Cited

U.S. PATENT DOCUMENTS 4,668,048 A * 5/1987 Amberg ................. G02B 7/028 359/820
4,789,707 A * 12/1988 Nishimura ........... C09D 161/20 525/157

(Continued)

FOREIGN PATENT DOCUMENTS

CN 103242731 A 8/2013
JP 2009-139856 A 6/2009

(Continued)

OTHER PUBLICATIONS

ShinEtsu, "KC-89S", https://www.shinetsusilicones.com/content.jsp?id=KC-89S&tbl=fluid, available at least as of 2014, accessed on Oct. 5, 2019 (Year: 2014).*

(Continued)

*Primary Examiner* — Stephone B Allen
*Assistant Examiner* — Adam W Booher
(74) *Attorney, Agent, or Firm* — Venable LLP

(57) ABSTRACT

Provided is a thermal barrier film having, dispersed in a resin matrix, high-refractive-index particles having a D-line refractive index of 2.5 or more and 3.2 or less. The high-refractive-index particles have an average particle size of 2.0 μm or more and 5.0 μm or less. Provided are a thermal barrier film that reduces a temperature rise due to sunlight by virtue of having a high reflectance even as a thin film, has high film thickness accuracy, and has high abrasion resistance, a thermal barrier paint for forming such thermal barrier film, and an optical instrument including such thermal barrier film.

13 Claims, 2 Drawing Sheets

9
7
5
8
6

(51) Int. Cl.

| | |
|---|---|
| ***C08K 3/22*** | (2006.01) |
| ***C09D 183/04*** | (2006.01) |
| ***C09D 5/33*** | (2006.01) |
| ***C08L 63/04*** | (2006.01) |
| ***C08G 59/62*** | (2006.01) |
| ***G02B 5/08*** | (2006.01) |
| ***C09D 175/14*** | (2006.01) |
| *C09D 133/00* | (2006.01) |
| *C08K 7/26* | (2006.01) |

(52) U.S. Cl.
CPC ......... *C09D 175/14* (2013.01); *C09D 183/04* (2013.01); *G02B 5/0808* (2013.01); *G02B 5/206* (2013.01); *G02B 5/208* (2013.01); *C08K 3/22* (2013.01); *C08K 7/26* (2013.01); *C08K 2003/2241* (2013.01); *C08K 2201/005* (2013.01); *C08K 2201/011* (2013.01); *C09D 133/00* (2013.01)

(58) Field of Classification Search
CPC ........ G02B 7/008; G02B 7/028; G02B 5/265; G02B 5/28–282; C09D 5/004; C09D 7/69; C09D 183/04–12; C09D 133/00; B32B 2307/416; C08K 2003/2241; C08K 2201/005
USPC ....... 359/350, 506, 599, 601, 611, 612, 820, 359/826; 427/160
See application file for complete search history.

(56) References Cited

U.S. PATENT DOCUMENTS

| | | | | |
|---|---|---|---|---|
| 5,154,768 | A * | 10/1992 | Yamada .................. | C09D 5/00 106/426 |
| 7,663,803 | B2 | 2/2010 | Ukuda et al. | |
| 2009/0029176 | A1* | 1/2009 | Nishida .................. | B32B 15/08 428/421 |
| 2011/0244219 | A1 | 10/2011 | Kubota | |
| 2013/0027766 | A1* | 1/2013 | Itoh ........................ | G02B 5/208 359/359 |
| 2013/0089706 | A1* | 4/2013 | Wen ........................ | E04D 7/005 428/143 |
| 2013/0222720 | A1* | 8/2013 | Tanihara ............... | G02F 1/1333 349/15 |
| 2014/0287220 | A1 | 9/2014 | Imai et al. | |
| 2015/0103513 | A1* | 4/2015 | Ge ....................... | C09D 133/12 362/97.3 |
| 2015/0171372 | A1* | 6/2015 | Iwata ...................... | C09D 7/41 257/40 |

FOREIGN PATENT DOCUMENTS

| | | | |
|---|---|---|---|
| JP | 2014-181494 | A | 9/2014 |
| JP | 2015-81303 | A | 4/2015 |
| JP | 2015-098543 | A | 5/2015 |

OTHER PUBLICATIONS

Notification of Reasons for Refusal in Japanese Application No. 2016-086144 (dated Mar. 24, 2020).

* cited by examiner

THERMAL BARRIER FILM, THERMAL BARRIER PAINT, AND OPTICAL INSTRUMENT

BACKGROUND OF THE INVENTION

Field of the Invention

The present invention relates to a thermal barrier film, and more particularly, to a thermal barrier film to be suitably used by being formed on a member, for example, a lens barrel of an optical instrument that may be used outdoors, and also relates to a thermal barrier paint for forming such thermal barrier film, and an optical instrument including a member, for example, a lens barrel, having such thermal barrier film formed thereon. Examples of the optical instrument that may be used outdoors include general cameras and video cameras, surveillance cameras and weather cameras for business use, and broadcast equipment.

Description of the Related Art

The term "thermal barrier film" as used herein refers to a film having the following function: when an optical instrument including a member having the film formed thereon is used outdoors, the film suppresses a temperature rise of the member due to sunlight. Hitherto, as a method of suppressing a temperature rise of a member due to sunlight, there has been known a method involving, as illustrated in FIG. 1, reflecting an incident light beam 1, which is sunlight, as a reflected light beam 2 by using an infrared reflective film 4 arranged on a base material 5 of the member. A temperature rise of the base material 5 due to absorption of a transmitted light beam 3 can be suppressed by increasing a ratio of the reflected light beam 2 to the incident light beam 1. As another method of suppressing a temperature rise of a member due to sunlight, there is known a method involving arranging, in place of the infrared reflective film 4, a heat-insulating layer having low thermal conductivity or a heat-dissipating layer configured to release heat to the outside, or a combination thereof. However, a subject matter of the present invention is not such heat-insulating layer or heat-dissipating layer, but is a thermal barrier film configured to reflect sunlight to suppress a temperature rise of a member.

The thermal barrier film configured to reflect sunlight is generally arranged on an outer surface of a member, and hence such thermal barrier film may be touched by a human hand. Accordingly, such thermal barrier film is required to have abrasion resistance for enduring external contact and friction in addition to the function of reflecting sunlight to suppress a temperature rise. In addition, when the thermal barrier film is used for a lens barrel or the like, positioning accuracy of a focus-adjusting operation is important. For example, as illustrated in FIG. 2, a lens barrel 8 of an optical instrument has a structure in which a lens 6 is arranged on an inside of the base material 5 having a cylindrical shape. In addition, a fitting portion 7 configured to slide during focus adjustment is arranged in the base material 5. Even when the optical instrument is exposed to sunlight, arrangement of a thermal barrier film 9 on a surface of the base material 5 can suppress thermal expansion due to a temperature rise of the lens barrel 8, to thereby keep positioning accuracy of a focus or the like. However, when there is a variation in film thickness of the thermal barrier film 9 arranged on the surface of the base material 5, smooth sliding of the fitting portion may be inhibited. Accordingly, when the thermal barrier film is arranged on precision equipment like the lens barrel, the variation in film thickness of the coating film needs to be suppressed.

In Japanese Patent Application Laid-Open No. 2009-139856, there is disclosed a thermal barrier film for a lens barrel, the thermal barrier film being formed of a colored layer, an infrared reflective layer, and a heat-insulating layer. In the lens barrel disclosed in Japanese Patent Application Laid-Open No. 2009-139856, in addition to the infrared reflective layer, the heat-insulating layer having a film thickness of from 500 μm to 2,000 μm is arranged to enhance a heat-shielding effect.

In addition, in Japanese Patent Application Laid-Open No. 2015-81303, there is disclosed a thermal barrier film having its abrasion resistance improved by adding, to a synthetic resin emulsion, powder of potsherd having a particle size of from 0.1 mm to 0.4 mm.

SUMMARY OF THE INVENTION

According to one embodiment of the present invention, there is provided an optical instrument, including a lens barrel including a lens on an inside thereof, in which the lens barrel has a thermal barrier film on at least part of an outer peripheral surface thereof, in which the thermal barrier film contains first particles having a D-line refractive index of 2.5 or more and 3.2 or less, and a resin, and in which the first particles have an average particle size of 2.0 μm or more and 5.0 μm or less.

According to another embodiment of the present invention, there is provided a thermal barrier film, including: first particles having a D-line refractive index of 2.5 or more and 3.2 or less; and a resin, in which the first particles have an average particle size of 2.0 μm or more and 5.0 μm or less.

According to still another embodiment of the present invention, there is provided a thermal barrier paint, including: first particles having a D-line refractive index of 2.5 or more and 3.2 or less; a resin; and a solvent, in which the first particles have an average particle size of 2.0 μm or more and 5.0 μm or less, and in which the resin has a D-line refractive index of 1.32 or more and 1.42 or less, or contains: any one resin selected from a urethane resin, an acrylic resin, an epoxy resin, and a combination thereof; and second particles that include pore-containing particles having an average particle size of 100 nm or less.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

When a heat-insulating layer having a film thickness of from 500 μm to 2,000 μm is arranged on a member as disclosed in Japanese Patent Application Laid-Open No. 2009-139856, the film thickness of the member as a whole is increased, and the positioning accuracy of a fitting portion configured to slide becomes difficult to sufficiently express in some cases.

In addition, when powder of potsherd having a large particle size is added as in the thermal barrier film disclosed in Japanese Patent Application Laid-Open No. 2015-81303, large unevenness is formed on the surface of the film, and hence film thickness accuracy becomes difficult to sufficiently express in some cases.

The present invention has been made in view of such problems, and provides a thermal barrier film that reduces a temperature rise due to sunlight by virtue of having a high reflectance for sunlight even as a thin film, has less variation in film thickness and high film thickness accuracy, and has high abrasion resistance, a thermal barrier paint for forming such thermal barrier film, and an optical instrument including such thermal barrier film.

Now, embodiments of the present invention are described. First, a mechanism of the increase of the reflectance for sunlight is described. Then, a thermal barrier paint and a thermal barrier film of the present invention, for increasing the reflectance for sunlight, and an optical instrument including such thermal barrier film are described.

Herein, when a state in which first particles are dispersed in a resin in the thermal barrier film is described, the "resin" serving as the dispersion medium is sometimes referred to "resin matrix". Particularly when a product obtained by dispersing, in the resin, second particles having an average particle size of 100 nm or less to adjust the D-line refractive index of the "resin" is used as the dispersion medium for the first particles having an average particle size of 2.0 μm or more and 5.0 μm or less, the combination of the resin and the second particles dispersed therein is sometimes referred to as "resin" or "resin matrix". In this case, the second particles are preferably "pore-containing particles". The term "pore-containing particles" as used herein refers to particles containing a hollow structure or a porous structure. Meanwhile, the first particles having an average particle size of 2.0 μm or more and 5.0 μm or less and having a D-line refractive index of 2.5 or more and 3.2 or less, which are dispersed in such "resin" or "resin matrix", are sometimes referred to as "high-refractive-index particles".

[Mechanism of Increase of Reflectance for Sunlight]

Figure 1:
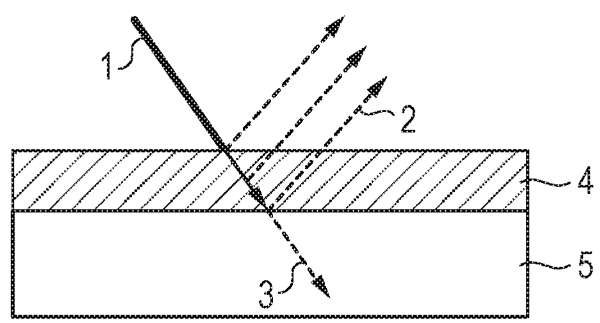
FIG. 1 is a cross-sectional schematic view for illustrating a state of reflection and absorption of sunlight when an infrared reflective film is formed on the upper surface of a base material.

The wavelengths of sunlight range from about 0.3 μm to about 3 μm. When, as illustrated in FIG. 1, light having those wavelengths penetrates the inside of a base material 5 as a transmitted light beam 3, the light is absorbed by the base material 5 and converted to thermal energy to heat the base material 5. Accordingly, in order to suppress a temperature rise due to sunlight without a heat-insulating layer, it is necessary to suppress the transmission of light to the inside of the base material as much as possible by increasing the ratio of a reflected light beam 2 to an incident light beam 1.

The range of the wavelengths of sunlight, i.e., from 0.3 μm to 3 μm, is a region of Mie scattering for a particle having a particle size of several μm. When calculation is performed for the Mie scattering, the reflectance for sunlight becomes highest at a particle size of about 1 μm. Accordingly, the particle size of each of particles in a reflective film for sunlight is generally set to about 1 μm. For the calculation of the Mie scattering, the equation of Light Scattering Theory (Department of Mechanical and Aerospace Engineering University of Florida; David W. Hahn) was used.

The inventors of the present invention have made extensive investigations in order to further increase the reflectance, and as a result, have found that the reflectance can be greatly increased by setting the particle size and refractive index of each of particles in a reflective film, and the refractive index of a resin matrix to appropriate ranges. The term "particle size" as used herein refers to a diameter obtained through conversion from the volume of a particle, and the particle size is determined with a laser diffraction particle size distribution analyzer. In addition, the term "average particle size" as used in the present invention refers to a median size.

First, the inventors of the present invention have found that the reflectance is increased through the use of particles having a D-line refractive index of 2.5 or more and 3.2 or less and having an average particle size of 2.0 μm or more. The particle size is larger than the optimal solution to the calculated value for the Mie scattering, i.e., 1 μm. In general calculation of the Mie scattering, the sum total of scattering in all 360° directions with respect to incident light is calculated. However, in the incident light, light that is actually reflected to exit the film undergoes only backscattering. Accordingly, a larger particle size provides a higher shielding effect and allows less forward scattering, and hence the particle size is desirably 2.0 μm or more in order to actually increase the reflectance. However, when the average particle size is more than 5.0 μm, unevenness of the film is increased to degrade film thickness accuracy. Therefore, the average particle size of the first particles in the invention of the present application is 2.0 μm or more and 5.0 μm or less.

Figure 3:
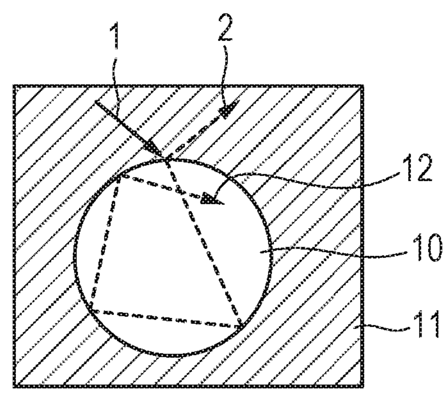
FIG. 3 is a cross-sectional schematic view for illustrating reflection at an interface between a particle and a resin.

Further, the inventors of the present invention have found that there is a correlation between the refractive index of the resin matrix and the refractive index of each of the particles, and the reflectance becomes highest when the D-line refractive index of each of the particles is 2.5 or more and 3.2 or less while the D-line refractive index of the resin matrix is 1.32 or more and 1.42 or less. As illustrated in FIG. 3, when the refractive index of a resin matrix 11 is high, a refractive index difference from a particle 10 is small and the ratio of light that penetrates the inside of the particle 10 is large. Accordingly, the amount of the reflected light beam 2 with respect to the incident light beam 1 is reduced. However, also when the refractive index of the resin matrix 11 is excessively low, the reflectance is decreased. This is presumably because the refractive index difference from the particle 10 becomes so large that a light beam 12 that has entered the inside of the particle 10 repeats total reflection in the particle, and hence the light is confined without being able to exit to the resin matrix 11 side. Accordingly, when the D-line refractive index of the particle is 2.5 or more and 3.2 or less, if the D-line refractive index of the resin matrix is 1.32 or more and 1.42 or less, the reflectance can be increased to enhance a temperature rise-reducing effect.

[Thermal Barrier Paint for Optical Instrument]

Next, the material construction of the thermal barrier paint of the present invention, for forming a thermal barrier film (sunlight reflective film) containing particles having a D-line refractive index of 2.5 or more and 3.2 or less and a resin matrix having a D-line refractive index of 1.32 or more and 1.42 or less, and a production method therefor are described.

<<Material Construction>>

The thermal barrier paint of the present invention contains at least first particles having a D-line refractive index of 2.5 or more and 3.2 or less in a solution obtained by dissolving a resin in a solvent.

(Particles having D-line Refractive Index of 2.5 or More and 3.2 or Less)

For the particles having a D-line refractive index of 2.5 or more and 3.2 or less (hereinafter referred to as "high-refractive-index particles"), there may be used particles formed of rutile-type titanium oxide or anatase-type titanium oxide as a most suitable material. In addition, when color adjustment is needed, particles formed of any of inorganic pigments, such as chromium oxide, titanium, copper oxide, tungsten, platinum, iron oxide, and hematite, and an azo-based organic pigment, each of which has absorption in a visible light region, may be used in place of the titanium oxide particles, or in combination with the titanium oxide particles. However, as compared to titanium oxide, which has a low extinction coefficient in a region ranging from visible light to infrared rays, a material having a high extinction coefficient in the visible light region tends to slightly decrease the reflectance for sunlight, but a higher reflectance for sunlight can be obtained by adjusting the particle size to the range of the present invention. The high-refractive-index particles may be used alone or as a mixture thereof.

The high-refractive-index particles in the present invention have an average particle size of 2.0 μm or more and 5.0 μm or less. When the average particle size is less than 2.0 μm, the reflectance for sunlight is decreased. Meanwhile, when the average particle size is more than 5.0 μm, unevenness of the film is increased to degrade film thickness accuracy. In addition, when particles having a particle size of 1.5 μm or less are increased, the ratio of light to be transmitted is increased, and as a result, the reflectance for sunlight is decreased. Accordingly, the ratio of high-refractive-index particles having a particle size of 1.5 μm or less is preferably adjusted to 35 mass % or less.

In addition, the high-refractive-index particles in the present invention may be such that the surface of each of the particles is coated with an arbitrary organic material or inorganic material. In addition, the shape of each of the high-refractive-index particles may be amorphous, spherical, scaly, or hollow, but high-refractive-index particles having a shape with less surface unevenness are more preferably used.

The content of the high-refractive-index particles in the present invention is preferably 10 wt % or more and 90 wt % or less with respect to the thermal barrier paint. When the content of the particles is less than 10 wt %, light that reaches the base material is increased, and hence the reflectance for sunlight is decreased. In addition, when the content of the particles is more than 90 wt %, the brittleness of the coating film is worsened.

(Resin Having D-line Refractive Index of 1.32 or More and 1.42 or Less)

The resin to be used for the thermal barrier paint of the present invention has a D-line refractive index of 1.32 or more and 1.42 or less. When the D-line refractive index of the resin is more than 1.42, the refractive index difference between the resin and each of the particles becomes small, and hence the reflectance at an interface between the resin and each of the particles is decreased. In addition, when the D-line refractive index of the resin is less than 1.32, the refractive index difference between the resin and each of the particles becomes excessively large and light that has entered the inside of each of the particles is confined. The confined light is eventually absorbed, and as a result, the reflectance for sunlight is decreased.

As the resin having a D-line refractive index of 1.32 or more and 1.42 or less, any material may be used as long as the material falls within such category, but a silicone resin, a fluorine resin, a resin having introduced therein a fluorine group, or the like is preferred. Examples of the silicone resin include various silicone resins, such as methyl-based, methyl/phenyl-based, propyl/phenyl-based, epoxy resin-modified, alkyd resin-modified, polyester resin-modified, and rubber-based silicone resins, and resins and oligomers thereof. For example, silicone resins such as KC-89S (Shin-Etsu Silicone) and KR-400 (Shin-Etsu Silicone) may be used. Examples of the resin having a D-line refractive index of 1.42 include X-41-1810 (Shin-Etsu Silicone), X-41-1805 (Shin-Etsu Silicone), X-41-1818 (Shin-Etsu Silicone), and KR251 (Shin-Etsu Silicone).

The content of the resin in the thermal barrier paint of the present invention is preferably 5 wt % or more and 50 wt % or less, more preferably 7 wt % or more and 30 wt % or less with respect to the thermal barrier paint. When the content of the resin is less than 5 wt %, adhesiveness with the base material is degraded. In addition, when the content of the resin is more than 50 wt %, the reflectance for sunlight is decreased.

Even when the resin itself has a D-line refractive index of more than 1.42, the resin may be used after the adjustment of its refractive index by being mixed with particles having a low refractive index and having an average particle size of 100 nm or less. The wavelengths of sunlight range from about 0.3 μm to about 3 μm as described above, and light having such wavelengths is not scattered by particles having an average particle size of 100 nm or less (hereinafter referred to as "fine particles") and exhibits a behavior equivalent to a behavior to a homogeneous composition having a refractive index obtained by averaging the refractive index of the resin and the refractive indices of the fine particles. Therefore, the refractive index of the resin (precisely a mixture of the resin and the fine particles) for sunlight can be adjusted with the fine particles having a low refractive index as described above.

The fine particles having a low refractive index may be solid particles formed of a material having a low refractive index. However, when the solid particles are mixed in the resin, the refractive index cannot be efficiently lowered unless solid particles formed of a material having a D-line refractive index (considerably) lower than 1.42 are used. In order to efficiently lower the refractive index, it is recommended that pore-containing particles be used as the fine particles. Pore-containing particles having an average particle size of 100 nm or less act on sunlight having wavelengths ranging from about 0.3 μm to about 3 μm as particles having a refractive index averaged with pore portions thereof included. Therefore, when such pore-containing particles (fine particles having a low refractive index) are mixed in the resin, the refractive index of the resin (resin matrix) in which the high-refractive-index particles are to be dispersed can be more efficiently lowered than the refractive index of the resin itself.

The pore-containing particles having an average particle size of 100 nm or less (fine particles having a low refractive index) are added to the resin for the purpose of lowering the refractive index of the resin, and hence it is preferred that a material for forming each of the particles itself also have a low refractive index. For example, pore-containing particles formed of silica, $MgF_2$, or an organic resin are preferred. Hollow silica particles are particularly preferred. The pore-containing particles may be porous structure-containing particles instead of being hollow. The shape of each of the pore-containing particles does not necessarily need to be spherical, and may be a spindle shape or amorphous. Preferred examples of the hollow particles may include Thrulya (JGC Corporation) and SiliNax (Nittetsu Mining Co., Ltd.), but the thermal barrier paint of the present invention is not limited to one containing any one of those hollow particles.

The average particle size of the pore-containing particles is preferably 5.0 nm or more and 100 nm or less. It is technically difficult to adjust the average particle size of the pore-containing particles (hollow particles) to less than 5.0 nm. In addition, when the average particle size is more than 100 nm, scattering occurs at an interface between the resin and each of the pore-containing particles.

The porosity of each of the pore-containing particles is preferably 10 vol % or more and 90 vol % or less. When the porosity is less than 10 vol %, the D-line refractive index of the resin matrix is difficult to lower to 1.42 or less. When the porosity is more than 90 vol %, the strength of each of the particles is decreased.

The content of the pore-containing particles is preferably 5 vol % or more and 50 vol % or less with respect to all components of the thermal barrier paint except for the solvent (that is, when the thermal barrier paint is formed into the thermal barrier film). When the content is less than 5 vol %, the refractive index of the coating film is difficult to decrease. In addition, when the content is more than 50 vol %, the abrasion resistance of the coating film is degraded.

As the resin that contains the pore-containing particles and forms the resin matrix, a resin selected from an acrylic resin, a urethane resin, an epoxy resin, and a combination thereof is preferred, and a urethane acrylate resin is particularly preferred.

As the acrylic resin, there may be preferably used, for example, ALMATEX 784 (Mitsui Chemicals, Inc.), ALMATEX 785-5 (Mitsui Chemicals, Inc.), ALMATEX 748-5M (Mitsui Chemicals, Inc.), Metal Lock (Cemedine Co., Ltd.), VONCOAT 40-418-EF (DIC), or VONCOAT CE-6400 (DIC).

As the urethane resin, for example, ADEKA POLYETHER BPX-21 (ADEKA), ADEKA POLYETHER EDP-300 (ADEKA), or ADEKA NEWACE V14-90 (ADEKA) may be preferably used. In addition, as a curing agent for the urethane resin, for example, TAKENATE D110N (Mitsui Chemicals, Inc.), D160N (Mitsui Chemicals, Inc.), D120N (Mitsui Chemicals, Inc.), or D140N (Mitsui Chemicals, Inc.) may be preferably used. The urethane resin and an isocyanate serving as the curing agent may be used by being mixed with each other at an equivalent ratio of 1:1.

As the epoxy resin, for example, jER828 (Mitsubishi Chemical Corporation), jER1001 (Mitsubishi Chemical Corporation), 834X70 (Mitsubishi Chemical Corporation), EP-4100 (Adeka Corporation), or EP-5100-75X (Adeka Corporation) may be preferably used. In addition, as a curing agent for the epoxy resin, for example, ADEKA HARDENER H30 (ADEKA), ADEKA HARDENER 6019 (Adeka Corporation), or ADEKA HARDENER EH-551CH (Adeka Corporation) may be preferably used. The epoxy resin and the curing agent may be used by being mixed with each other at an equivalent ratio of 1:1.

As the urethane acrylate resin, for example, OLESTER Q164 (Mitsui Chemicals, Inc.), OLESTER Q691 (Mitsui Chemicals, Inc.), OLESTER Q723 (Mitsui Chemicals, Inc.), OLESTER Q628 (Mitsui Chemicals, Inc.), AH-600 (Kyoeisha Chemical Co., Ltd.), or 8965 (U-Pica) may be preferably used. In addition, as a curing agent for the urethane acrylate resin, for example, TAKENATE D110N (Mitsui Chemicals, Inc.), D160N (Mitsui Chemicals, Inc.), D120N (Mitsui Chemicals, Inc.), or D140N (Mitsui Chemicals, Inc.) containing a urethane bond may be preferably used. The acrylic resin and the curing agent may be used by being mixed with each other at an equivalent ratio of 1:1.

In addition, the pencil hardness of the resin having a D-line refractive index of 1.32 or more and 1.42 or less, which forms the resin matrix serving as a dispersion medium for the high-refractive-index particles (by itself, or including the fine particles having a low refractive index), is preferably H or more and 5H or less, more preferably 1H or more and 3H or less. When the pencil hardness is less than H, the abrasion resistance is degraded. In addition, when the pencil hardness is more than 5H, the thermal barrier paint becomes weak against a thermal shock.

(Solvent)

As the solvent, any material may be used. Examples of the solvent include water, a thinner, ethanol, isopropyl alcohol, n-butyl alcohol, ethyl acetate, propyl acetate, isobutyl acetate, butyl acetate, methyl ethyl ketone, methyl isobutyl ketone, propylene glycol monomethyl ether, toluene, xylene, acetone, cellosolves, glycol ethers, and ethers. Those solvents may be used alone or as a mixture thereof.

The viscosity of the thermal barrier paint is preferably 10 mPa·s or more and 10,000 mPa·s or less. When the viscosity of the thermal barrier paint is less than 10 mPa·s, a site in which the film thickness of the thermal barrier film after application becomes small may occur. In addition, when the viscosity is more than 10,000 mPa·s, the applicability of the thermal barrier paint is decreased.

(Additive)

The thermal barrier paint of the present invention may contain any other additive. Examples thereof include a dispersant, a curing agent, a curing catalyst, a plasticizer, a thixotropy-imparting agent, a leveling agent, an infrared transmission-type organic colorant, an infrared transmission-type inorganic colorant, an antiseptic, a ultraviolet absorber, an antioxidant, a coupling agent, inorganic particles and organic particles having a D-line refractive index of 2.5 or less, and inorganic particles having a D-line refractive index of 3.2 or more.

As the dispersant, any one of DISPERBYK-118 (BYK Japan KK), DISPERBYK-110 (BYK Japan KK), DISPERBYK-111 (BYK Japan KK), DISPERBYK-102 (BYK Japan KK), DISPERBYK-190 (BYK Japan KK), DISPERBYK-106 (BYK Japan KK), DISPERBYK-180 (BYK Japan KK), DISPERBYK-108 (BYK Japan KK), and DEMOL EP (Kao Corporation) may be used.

<<Production Method for Thermal Barrier Paint>>

Now, a production method for the thermal barrier paint of the present invention is described.

As the production method for the thermal barrier paint of the present invention, any method may be used as long as the particles having a D-line refractive index of 2.5 or more and 3.2 or less (high-refractive-index particles) can be dispersed in the thermal barrier paint (which may contain the fine particles having a low refractive index). Examples thereof include a bead mill, a ball mill, a jet mill, triple rollers, a planetary rotation apparatus, a mixer, and an ultrasonic dispersing machine.

[Thermal Barrier Film for Optical Instrument]

The material construction and film construction of the thermal barrier film of the present invention are described below.

<<Material Construction>>

Now, the material construction of the thermal barrier film for an optical instrument of the present invention is described.

The thermal barrier film of the present invention contains particles having a D-line refractive index of 2.5 or more and 3.2 or less (high-refractive-index particles), and a resin matrix (which may contain fine particles having a low refractive index).

(Particles Having D-line Refractive Index of 2.5 or More and 3.2 or Less)

In the thermal barrier film formed by applying the thermal barrier paint, the content of the particles having a D-line refractive index of 2.5 or more and 3.2 or less (high-refractive-index particles) in the present invention is preferably 20 vol % or more and 60 vol % or less in terms of a ratio to the thermal barrier film. When the content of the high-refractive-index particles is less than 20 vol %, light that reaches the base material is increased, and hence the reflectance for sunlight is decreased. In addition, when the content of the high-refractive-index particles is more than 60 vol %, the brittleness of the coating film is worsened.

(Pore-containing Particles having Average Particle Size of 100 nm or Less)

The content of pore-containing particles having an average particle size of 100 nm or less, which are added to the resin in order to decrease the refractive index of the resin matrix, with respect to the thermal barrier film is preferably 5 vol % or more and 50 vol % or less. When the content is less than 5 vol %, the refractive index of the coating film is difficult to decrease. In addition, when the content is more than 50 vol %, the abrasion resistance of the coating film is degraded.

(Resin)

The content of the resin with respect to the thermal barrier film is preferably 10 vol % or more and 75 vol % or less, more preferably 20 vol % or more and 70 vol % or less. When the content of the resin in the present invention is less than 10 vol %, adhesiveness with the base material is degraded. In addition, when the content of the resin in the present invention is more than 75 vol %, the reflectance for sunlight is degraded.

(Additive)

The thermal barrier paint of the present invention may contain any other additive as part of the resin matrix as long as the D-line refractive index of the resin matrix falls within the range of 1.32 or more and 1.42 or less. Examples thereof include a dispersant, a curing agent, a curing catalyst, a plasticizer, a thixotropy-imparting agent, a leveling agent, an infrared transmission-type organic colorant, an infrared transmission-type inorganic colorant, an antiseptic, an ultraviolet absorber, an antioxidant, a coupling agent, inorganic particles and organic particles having a D-line refractive index of 2.5 or less, and inorganic particles having a D-line refractive index of 3.2 or more.

<<Film Construction>>

Figure 2:
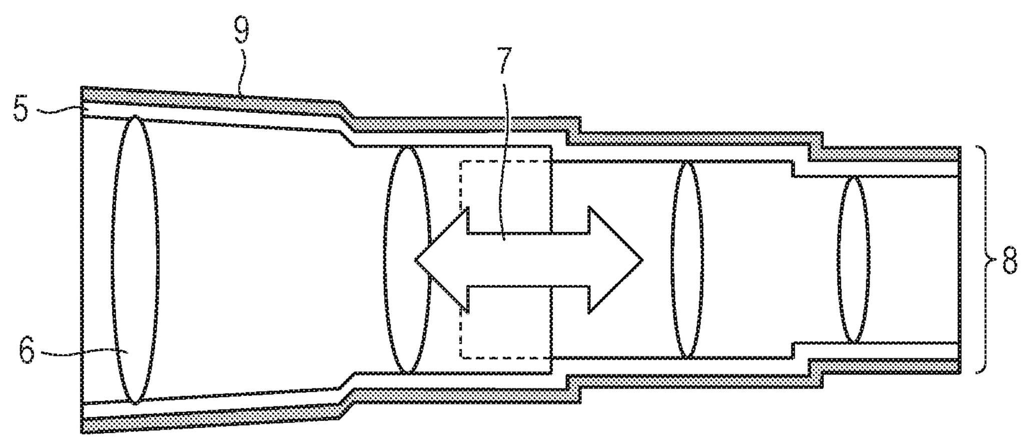
FIG. 2 is a cross-sectional schematic view of a lens barrel.

As illustrated in FIG. 2, a thermal barrier film 9 of the present invention is formed on an outer side of at least the base material 5 of a lens barrel 8. As a mode of the thermal barrier film 9, the thermal barrier film 9 may adhere to the base material 5, or a primer layer configured to improve adhesiveness may be arranged between the base material 5 and the thermal barrier film 9.

(Base Material)

As the base material, any material may be used, but a metal or a plastic is preferred. Examples of the metal material include aluminum, titanium, stainless steel, and magnesium alloys. Examples of the plastic material include a polycarbonate resin, an acrylic resin, an ABS resin, and a fluorine resin.

In addition, the base material may have any thickness as its film thickness, but the film thickness is preferably 0.5 mm or more and 5 mm or less, more preferably 0.5 mm or more and 2 mm or less. When the film thickness is less than 0.5 mm, the shape of the lens barrel is difficult to keep. In addition, when the film thickness is more than 5 mm, the cost of the member is increased.

(Primer Layer)

For the primer layer, any material may be used, and examples thereof include an epoxy resin, a urethane resin, an acrylic resin, a silicone resin, and a fluorine resin. In addition, the primer layer may contain high-refractive-index particles or other particles, a colorant, a dispersant, a curing agent, a curing catalyst, a plasticizer, a thixotropy-imparting agent, a leveling agent, an organic colorant, an inorganic colorant, an antiseptic, an ultraviolet absorber, an antioxidant, a coupling agent, a residue of a solvent, or the like.

In addition, the film thickness of the primer layer is preferably 2 μm or more and 30 μm or less, more preferably 5 μm or more and 20 μm or less. When the film thickness is less than 2 μm, the adhesiveness of the film may be decreased. When the film thickness is more than 30 μm, film thickness accuracy may be adversely affected.

(Film Thickness of Thermal Barrier Film)

The average film thickness of the thermal barrier film is preferably 10 μm or more and 70 μm or less. When the film thickness is less than 10 μm, there is a risk in that light may be transmitted to a base material side to degrade the reflectance for sunlight. When the film thickness is more than 70 μm, there is a risk in that film thickness accuracy may be degraded. The average film thickness is preferably within ±10 μm with respect to a standard value.

<<Method of Forming Thermal Barrier Film of the Present Invention>>

The optical instrument of the present invention includes a lens barrel including a lens on an inside thereof, in which the lens barrel has the thermal barrier film of the present invention on at least part of an outer peripheral surface thereof. The thermal barrier film of the present invention is formed by being applied onto the outer peripheral surface of the lens barrel so as to have an average film thickness of preferably 10 μm or more and 70 μm or less. Any application method and curing method may be used as long as the methods allow the thermal barrier paint of the present invention to be uniformly applied.

Examples of the application method for the thermal barrier film for the optical instrument of the present invention include brush application, spray coating, dip coating, and transfer. In addition, the thermal barrier film may be applied by single-layer coating or multilayer coating, and may be embossed in order to express a design.

In addition, the curing method for the thermal barrier film for the optical instrument of the present invention may involve standing at room temperature, or may involve promoting curing with arbitrary heat or applying ultraviolet light. As a method involving causing curing by applying heat, there are given a heating furnace, a heater, infrared heating, and the like. A curing temperature is preferably from room temperature to 400° C., more preferably from room temperature to 200° C.

According to the present invention, the thermal barrier film to be suitably used by being formed on, for example, a lens barrel of an optical instrument that may be used outdoors, the thermal barrier film reducing a temperature rise due to sunlight by virtue of a high reflectance for sunlight even as a thin film, having less variation in film thickness and high film thickness accuracy, and having high abrasion resistance, the thermal barrier paint for forming such thermal barrier film, and the optical instrument including such thermal barrier film are provided.

EXAMPLES 1 TO 15

In each of Examples 1 to 15, the preparation of a thermal barrier paint, the production of a thermal barrier film, the evaluation of reflectance, the evaluation of temperature, and the evaluation of film thickness accuracy were performed as described below.

<Measurement Method for Reflectance>

Figure 4:
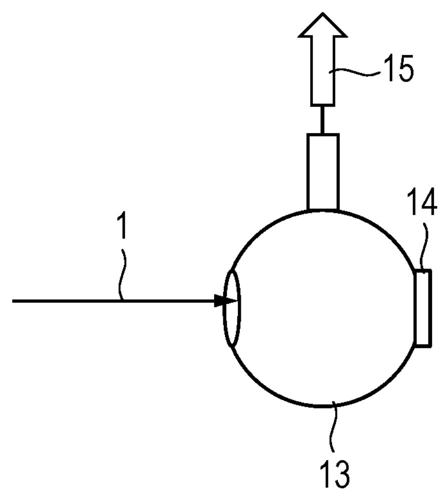
FIG. 4 is a schematic view for illustrating a mode of measurement of a reflectance with a spectrophotometer.

The reflectance was measured with a spectrophotometer (U-4000; Hitachi High-Tech Science Corporation) as illustrated in FIG. 4. As a sample for measurement, a metal plate of 30 mm square and 1 mm thick having the thermal barrier film of the present invention formed thereon was used. As the metal plate, any one of stainless steel, aluminum, titanium, magnesium alloys, and the like was used. In addition, the thermal barrier film of the present invention was applied onto the surface of the metal plate with a spin coater so as to have a desired film thickness, and was fired.

Next, a measurement method for the reflectance is described. As illustrated in FIG. 4, an incident light beam 1 having a wavelength of from 400 nm to 2,600 nm was allowed to enter an integrating sphere 13. First, the test piece at an angle of incidence inclined by 5° with respect to the incident light beam 1 was mounted to a test piece mounting portion 14, a blank of an alumina sintered compact configured to cause 100% reflection was placed, and baseline measurement was performed. Then, the test piece having the thermal barrier film of the present invention formed thereon was placed on the test piece mounting portion 14 instead of the blank, and light of from 400 nm to 2,600 nm was allowed to enter and detected with a detector 15 to measure the reflectance. In addition, the reflectance was described as a value for an average reflectance in the range of from 400 nm to 2,600 nm at intervals of 1 nm. The reflectance had a correlation with the evaluation result of the temperature, and when the reflectance was 94% or more, a satisfactory value was shown in the temperature evaluation result described below. In view of this, it may be said that a thermal barrier film is satisfactory when its reflectance is 94% or more.

<Evaluation Method for Temperature Rise-reducing Effect>

Figure 5:
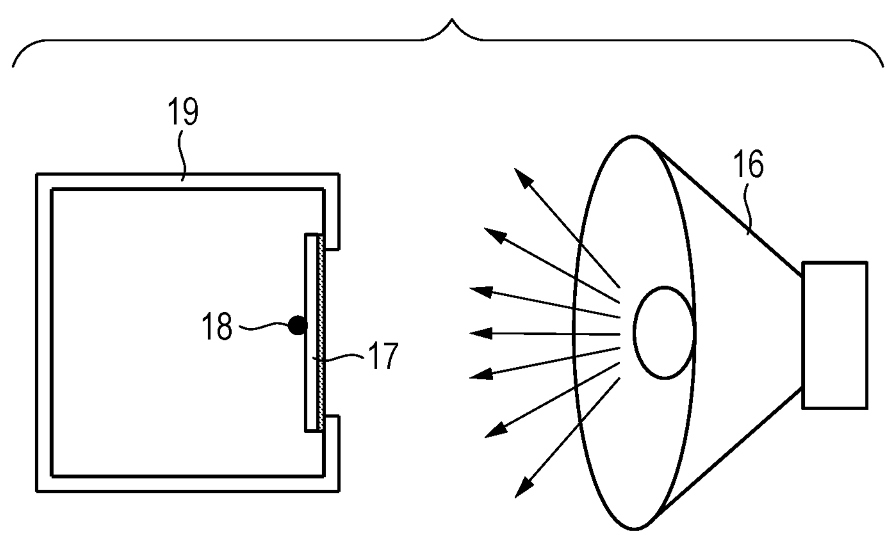
FIG. 5 is a schematic view for illustrating an evaluation method for temperature.

FIG. 5 is a schematic view for illustrating an evaluation method for temperature. As illustrated in FIG. 5, for the temperature measurement, a lamp 16, a jig 19 for temperature measurement, and a test piece 17 for temperature evaluation were used. In the temperature measurement, measurement was performed at a temperature measurement site 18.

As the test piece 17 for temperature evaluation, a metal plate of 100 mm square and 1 mm thick having the thermal barrier film of the present invention formed thereon was used. As the metal plate, any one of stainless steel, aluminum, titanium, magnesium alloys, and the like was used. In addition, the thermal barrier film of the present invention was applied onto the surface of the metal plate with a spin coater so as to have a desired film thickness, and was fired. As the jig 19 for temperature measurement, a cardboard box of 120 mm×120 mm×120 mm having a white surface was used, and a window of 90 mm×90 mm square was formed at a portion thereof to which the test piece 17 for temperature evaluation was to be mounted. In addition, as the lamp 16, Hilux MT150FD6500K (Iwasaki Electric Co., Ltd.) was used.

Next, the test piece 17 for temperature evaluation was mounted to the jig 19 for temperature measurement, and a thermocouple was mounted to the temperature measurement site 18 on the back surface of the test piece 17 for temperature evaluation. The jig 19 for temperature measurement mounted with the test piece 17 for temperature evaluation was placed at a distance of 100 mm from the lamp 16. Next, the test piece 17 for temperature evaluation was irradiated with light from the lamp 16 for 60 minutes, and its temperature after the 60 minutes was measured.

A temperature rise-reducing effect was determined as follows: a black blank was formed on the surface of the test piece 17 for temperature evaluation, temperature measurement was performed, and a difference from the temperature measurement result of the thermal barrier film of each of Examples was calculated and defined as the temperature rise-reducing effect.

The black blank was produced by applying a coating material, which had been obtained by mixing 20 g of carbon black (MA100; Mitsubishi Chemical Corporation), 100 g of an epoxy resin (jER828; Mitsubishi Chemical Corporation), 70 g of an amine curing agent (ST11; Mitsubishi Chemical Corporation), and 20 g of a thinner through the use of a planetary rotation apparatus, onto the surface of the test piece 17 for temperature evaluation, followed by firing.

When having a temperature rise-reducing effect of from 15° C. to 20° C., a thermal barrier film was evaluated as satisfactory (tables below: ○). In addition, when having a temperature rise-reducing effect of less than 15° C., a thermal barrier film was evaluated as unsatisfactory (tables below: ×).

<Evaluation Method for Film Thickness Accuracy>

Now, an evaluation method for film thickness accuracy is described. An optical instrument requires strict positioning accuracy, and when there is a variation in film thickness accuracy, the positioning accuracy is degraded. For a sample for film thickness accuracy evaluation, the thermal barrier film of the present invention was applied onto a metal plate of 30 mm square and 1 mm thick with a spray so that the thermal barrier film of the present invention had a desired film thickness, followed by firing. 20 of the samples for evaluation were prepared, and film thicknesses at five sites were measured for each of the samples with a micrometer and an average value for the film thicknesses was calculated and defined as a film thickness. In addition, an average value for the film thicknesses of the 20 test pieces was calculated, and the maximum deviation from the average value was defined as a value for film thickness variation. The maximum deviation was the maximum deviation for the 20 test piecesxfive sites, i.e., a total of 100 sites.

When the film thickness variation was at an accuracy of within ±10 μm, the uniformity of the film thickness was evaluated as satisfactory (tables below: 0). When the film thickness variation was beyond ±10 μm and within ±15 μm, the film thickness uniformity was evaluated to be such that the positioning accuracy was slightly inferior but the film was usable for an optical instrument (tables below: Δ). When the film thickness variation is beyond ±15 μm, the positioning accuracy is degraded, and hence the film is difficult to use for an optical instrument (tables below: x).

EXAMPLE 1

<Preparation of Thermal Barrier Paint>

In Example 1, a thermal barrier paint was produced by the following method. 210 g of titanium oxide HT0210 (Toho Titanium Co., Ltd.; average particle size: 2.25 μm), 40 g of a silicone resin, 2.4 g of a dispersant, and 30 g of a solvent were weighed out, and stirred in a planetary rotation apparatus (Awatori Rentaro; Thinky Corporation) for 10 minutes to provide the thermal barrier paint of Example 1.

<Production of Thermal Barrier Film>

In Example 1, a thermal barrier film was produced by the following method using materials and conditions shown in Table 1. The above-mentioned thermal barrier paint was applied to each of the test piece for reflectance measurement, the test piece for temperature evaluation, and the test piece for film thickness accuracy evaluation so as to have a film thickness of 40 μm, and cured at room temperature for 1 hour to provide the thermal barrier film of Example 1.

EXAMPLES 2 TO 15

In Examples 2 to 15, thermal barrier paints and thermal barrier films were produced in the same manner as in Example 1 except that materials and conditions shown in Tables 1 to 3 were used. As titanium oxide having an average particle size of 3 μm, HT0110 (Toho Titanium Co., Ltd.) was used, and titanium oxide having an average particle size of 5 μm was produced by drying titanium oxide having a particle size of 80 nm in a rotary kiln at low temperature and then firing the resultant at a temperature of 1,100° C. for 2 hours.

As a resin having a D-line refractive index of 1.42, any one of X-41-1810 (Shin-Etsu Silicone), X-41-1805 (Shin-Etsu Silicone), X-41-1818 (Shin-Etsu Silicone), and KR251 (Shin-Etsu Silicone) was used. As a fluorine resin, ZEFFLE (Daikin Industries, Ltd.; D-line refractive index: 1.40) was used.

In all Examples, the ratio of particles having a D-line refractive index of 2.5 or more and 3.2 or less and a particle size of 1.5 μm or less was adjusted to 35 mass % or less.

TABLE 1

| | | | Thermal barrier film of Example 1 | Thermal barrier film of Example 2 | Thermal barrier film of Example 3 | Thermal barrier film of Example 4 | Thermal barrier film of Example 5 |
|---|---|---|---|---|---|---|---|
| Thermal barrier film | Particle | Material | Titanium oxide | Titanium oxide | Titanium oxide | Titanium oxide | Titanium oxide |
| | | D-line refractive index | 2.72 | 2.72 | 2.72 | 2.72 | 2.72 |
| | | Average particle size (μm) | 2.25 | 3 | 5 | 2.25 | 2.25 |
| | | Ratio of particles having particle size of 1.5 μm or less (%) | 10 | Less than 1 | Less than 1 | 35 | Less than 1 |
| | | Content (vol %) | 49 | 49 | 49 | 49 | 20 |
| | Resin | Material | Silicone | Silicone | Silicone | Silicone | Silicone |
| | | D-line refractive index | 1.39 | 1.39 | 1.39 | 1.39 | 1.39 |
| | | Content (vol %) | 33 | 33 | 33 | 33 | 78 |
| | Dispersant | Addition amount (vol %) | 2 | 2 | 2 | 2 | 2 |
| Method of forming thermal barrier film | Film thickness (μm) | | 40 | 40 | 40 | 40 | 40 |
| | Curing temperature (° C.) | | Room temperature | Room temperature | Room temperature | Room temperature | Room temperature |
| | Curing time (hour) | | 1 | 1 | 1 | 1 | 1 |

TABLE 2

| | | | Thermal barrier film of Example 6 | Thermal barrier film of Example 7 | Thermal barrier film of Example 8 | Thermal barrier film of Example 9 | Thermal barrier film of Example 10 |
|---|---|---|---|---|---|---|---|
| Thermal barrier film | Particle | Material | Titanium oxide | Titanium oxide | Titanium oxide | Titanium oxide | Titanium oxide |
| | | D-line refractive index | 2.72 | 2.72 | 2.72 | 2.72 | 2.72 |
| | | Average particle size (μm) | 2.25 | 2.25 | 2.25 | 2.25 | 2.25 |
| | | Ratio of particles having particle size of 1.5 μm or less (%) | Less than 1 | Less than 1 | Less than 1 | 10 | 10 |
| | | Content (vol %) | 22 | 59 | 60 | 49 | 49 |
| | Resin | Material | Silicone | Silicone | Silicone | Silicone | Silicone hollow particles |
| | | D-line refractive index | 1.39 | 1.39 | 1.39 | 1.4 | 1.32 |
| | | Content (vol %) | 76 | 39 | 38 | 33 | 33 |
| | Dispersant | Addition amount (vol %) | 2 | 2 | 2 | 2 | 2 |

TABLE 2-continued

| | | Thermal barrier film of Example 6 | Thermal barrier film of Example 7 | Thermal barrier film of Example 8 | Thermal barrier film of Example 9 | Thermal barrier film of Example 10 |
|---|---|---|---|---|---|---|
| Method of forming thermal barrier film | Film thickness (μm) | 40 | 40 | 40 | 40 | 40 |
| | Curing temperature (° C.) | Room temperature | Room temperature | Room temperature | Room temperature | Room temperature |
| | Curing time (hour) | 1 | 1 | 1 | 1 | 1 |

TABLE 3

| | | | Thermal barrier film of Example 11 | Thermal barrier film of Example 12 | Thermal barrier film of Example 13 | Thermal barrier film of Example 14 | Thermal barrier film of Example 15 |
|---|---|---|---|---|---|---|---|
| Thermal barrier film | Particle | Material | Titanium oxide | Titanium oxide | Titanium oxide | Titanium oxide | Titanium oxide |
| | | D-line refractive index | 2.72 | 2.72 | 2.72 | 2.72 | 2.72 |
| | | Average particle size (μm) | 2.25 | 2.25 | 2.25 | 2.25 | 2.25 |
| | | Ratio of particles having particle size of 1.5 μm or less (%) | 10 | 10 | 10 | 10 | 10 |
| | | Content (vol %) | 49 | 49 | 49 | 49 | 49 |
| | Resin | Material | Silicone | Silicone | Silicone | Silicone | Silicone |
| | | D-line refractive index | 1.42 | 1.39 | 1.39 | 1.39 | 1.39 |
| | | Content (vol %) | 33 | 33 | 33 | 33 | 33 |
| | Dispersant | Addition amount (vol %) | 2 | 2 | 2 | 2 | 2 |
| Method of forming thermal barrier film | | Film thickness (μm) | 40 | 9 | 10 | 70 | 80 |
| | | Curing temperature (° C.) | Room temperature | Room temperature | Room temperature | Room temperature | Room temperature |
| | | Curing time (hour) | 1 | 1 | 1 | 1 | 1 |

<Evaluation Results>

The evaluation results of the reflectance and temperature rise-reducing effect of the thermal barrier film of each of Examples 1 to 15 by the above-mentioned methods are shown in Tables 4 to 6.

As a measurement result, the reflectance of the thermal barrier film is preferably 94% or more. In addition, the temperature rise-reducing effect is preferably a difference from the blank of 15° C. or more (○). In addition, the film thickness accuracy is preferably within ±15 μm (A), and the film thickness accuracy is more preferably within ±10 μm (o).

In Example 1, as shown in Table 1, titanium oxide having an average particle size of 2.25 μm and a silicone resin having a D-line refractive index of 1.39 were used. The evaluation results of the reflectance and temperature rise-reducing effect of the obtained thermal barrier film are shown in Table 4. The evaluation result of the reflectance was 96% and satisfactory. In addition, the temperature rise-reducing effect was 15° C. or more and satisfactory. In addition, the evaluation result of the film thickness accuracy was within ±10 μm and satisfactory.

In Example 2, as compared to Example 1, titanium oxide having a particle size as large as an average particle size of 3 μm was used. The evaluation results of the reflectance, temperature rise-reducing effect, and film thickness accuracy of the obtained thermal barrier film are shown in Table 4. The evaluation result of the reflectance was 96% and satisfactory. In addition, the temperature rise-reducing effect was 15° C. or more and satisfactory. In addition, the evaluation result of the film thickness accuracy was within ±10 μm and satisfactory.

In Example 3, as compared to Example 1, titanium oxide having a particle size as large as an average particle size of 5 μm was used. The evaluation results of the reflectance, temperature rise-reducing effect, and film thickness accuracy of the obtained thermal barrier film are shown in Table 4. The evaluation result of the reflectance was 95% and satisfactory. In addition, the temperature rise-reducing effect was 15° C. or more and satisfactory. In addition, the evaluation result of the film thickness accuracy was within ±10 μm and satisfactory.

In Example 4, as compared to Example 1, titanium oxide adjusted by adding titanium oxide particles having an average particle size of 1 μm (JR-1000; Tayca Corporation) so that the ratio of particles having a particle size of 1.5 μm or less to all particles was 35 vol % was used. The evaluation results of the reflectance, temperature rise-reducing effect, and film thickness accuracy of the obtained thermal barrier film are shown in Table 4. The evaluation result of the reflectance was 95% and satisfactory. In addition, the temperature rise-reducing effect was 15° C. or more and satisfactory. In addition, the evaluation result of the film thickness accuracy was within ±10 μm and satisfactory.

In Example 5, as compared to Example 1, the ratio of titanium oxide to the thermal barrier film was adjusted to 20 vol %. The evaluation results of the reflectance, temperature rise-reducing effect, and film thickness accuracy of the obtained thermal barrier film are shown in Table 4. The evaluation result of the reflectance was 94% and satisfactory. In addition, the temperature rise-reducing effect was 15° C. and slightly inferior, but was satisfactory. In addition, the evaluation result of the film thickness accuracy was within ±10 μm and satisfactory.

In Example 6, as compared to Example 1, the ratio of titanium oxide to the thermal barrier film was adjusted to 22 vol %. The evaluation results of the reflectance, temperature rise-reducing effect, and film thickness accuracy of the obtained thermal barrier film are shown in Table 5. The evaluation result of the reflectance was 95% and satisfactory. In addition, the temperature rise-reducing effect was 15° C. or more and satisfactory. In addition, the evaluation result of the film thickness accuracy was within ±10 μm and satisfactory.

In Example 7, as compared to Example 1, the ratio of titanium oxide to the thermal barrier film was adjusted to 59 vol %. The evaluation results of the reflectance, temperature rise-reducing effect, and film thickness accuracy of the obtained thermal barrier film are shown in Table 5. The evaluation result of the reflectance was 98% and satisfactory. In addition, the temperature rise-reducing effect was 15° C. or more and satisfactory. In addition, the evaluation result of the film thickness accuracy was within ±10 μm and satisfactory.

In Example 8, as compared to Example 1, the ratio of titanium oxide to the thermal barrier film was adjusted to 60 vol %. The evaluation results of the reflectance, temperature rise-reducing effect, and film thickness accuracy of the obtained thermal barrier film are shown in Table 5. The evaluation result of the reflectance was 98% and satisfactory. In addition, the temperature rise-reducing effect was 15° C. or more and satisfactory, and the brittleness was slightly worsened but at a usable level. In addition, the evaluation result of the film thickness accuracy was within ±10 μm and satisfactory.

In Example 9, as compared to Example 1, a fluorine resin was used in place of the silicone resin. The evaluation results of the reflectance, temperature rise-reducing effect, and film thickness accuracy of the obtained thermal barrier film are shown in Table 5. The evaluation result of the reflectance was 95% and satisfactory. In addition, the temperature rise-reducing effect was 15° C. or more and satisfactory. In addition, the evaluation result of the film thickness accuracy was within ±10 μm and satisfactory.

In Example 10, as compared to Example 1, hollow particles were mixed in the silicone resin to adjust the D-line refractive index to 1.32. The evaluation results of the reflectance, temperature rise-reducing effect, and film thickness accuracy of the obtained thermal barrier film are shown in Table 5. The evaluation result of the reflectance was 95% and satisfactory. In addition, the temperature rise-reducing effect was 15° C. or more and satisfactory. In addition, the evaluation result of the film thickness accuracy was within ±10 μm and satisfactory.

In Example 11, as compared to Example 1, as the resin, a silicone resin having a D-line refractive index of 1.42 was used. The evaluation results of the reflectance, temperature rise-reducing effect, and film thickness accuracy of the obtained thermal barrier film are shown in Table 6. The evaluation result of the reflectance was 95% and satisfactory. In addition, the temperature rise-reducing effect was 15° C. or more and satisfactory. In addition, the evaluation result of the film thickness accuracy was within ±10 μm and satisfactory.

In Example 12, as compared to Example 1, the film thickness was adjusted to 9 μm. The evaluation results of the reflectance, temperature rise-reducing effect, and film thickness accuracy of the obtained thermal barrier film are shown in Table 6. The evaluation result of the reflectance was 94% and satisfactory. In addition, the temperature rise-reducing effect was 15° C. and slightly inferior, but was satisfactory. In addition, the evaluation result of the film thickness accuracy was within ±10 μm and satisfactory.

In Example 13, as compared to Example 1, the film thickness was adjusted to 10 μm. The evaluation results of the reflectance, temperature rise-reducing effect, and film thickness accuracy of the obtained thermal barrier film are shown in Table 6. The evaluation result of the reflectance was 96% and satisfactory. In addition, the temperature rise-reducing effect was 15° C. or more and satisfactory. In addition, the evaluation result of the film thickness accuracy was within ±10 μm and satisfactory.

In Example 14, as compared to Example 1, the film thickness was adjusted to 70 μm. The evaluation results of the reflectance, temperature rise-reducing effect, and film thickness accuracy of the obtained thermal barrier film are shown in Table 6. The evaluation result of the reflectance was 96% and satisfactory. In addition, the temperature rise-reducing effect was 15° C. or more and satisfactory. In addition, the evaluation result of the film thickness accuracy was within ±10 μm and satisfactory.

In Example 15, as compared to Example 1, the film thickness was adjusted to 80 μm. The evaluation results of the reflectance, temperature rise-reducing effect, and film thickness accuracy of the obtained thermal barrier film are shown in Table 6. The evaluation result of the reflectance was 96% and satisfactory. In addition, the temperature rise-reducing effect was 15° C. or more and satisfactory. In addition, the evaluation result of the film thickness accuracy was ±11 μm to 15 μm and slightly inferior, but was at a level allowing use for an optical instrument.

TABLE 4

| | Thermal barrier film of Example 1 | Thermal barrier film of Example 2 | Thermal barrier film of Example 3 | Thermal barrier film of Example 4 | Thermal barrier film of Example 5 |
|---|---|---|---|---|---|
| Reflectance (%; 400 nm to 2,600 nm Ave.) | 96 | 96 | 95 | 95 | 94 |
| Temperature rise-reducing effect | ○ | ○ | ○ | ○ | ○ |
| Film thickness accuracy | ○ | ○ | ○ | ○ | ○ |

TABLE 5

| | Thermal barrier film of Example 6 | Thermal barrier film of Example 7 | Thermal barrier film of Example 8 | Thermal barrier film of Example 9 | Thermal barrier film of Example 10 |
|---|---|---|---|---|---|
| Reflectance (%; 400 nm to 2,600 nm Ave.) | 95 | 98 | 98 | 95 | 95 |
| Temperature rise-reducing effect | ○ | ○ | ○ | ○ | ○ |
| Film thickness accuracy | ○ | ○ | ○ | ○ | ○ |

TABLE 6

| | Thermal barrier film of Example 11 | Thermal barrier film of Example 12 | Thermal barrier film of Example 13 | Thermal barrier film of Example 14 | Thermal barrier film of Example 15 |
|---|---|---|---|---|---|
| Reflectance (%; 400 nm to 2,600 nm Ave.) | 95 | 94 | 96 | 96 | 96 |
| Temperature rise-reducing effect | ○ | ○ | ○ | ○ | ○ |
| Film thickness accuracy | ○ | ○ | ○ | ○ | Δ |

Comparative Examples 1 to 7

The preparation of thermal barrier paints for comparison, the production of thermal barrier films, the evaluation of reflectances, the evaluation of temperature rise-reducing effects, and the evaluation of film thickness accuracies were performed in the same manner as in Examples 1 to 15 described above. Differences from Examples 1 to 15 are described below. In Tables 7 and 8, materials for the thermal barrier films of Comparative Examples 1 to 7 and their contents are shown, and in Tables 9 and 10, evaluation results obtained using the thermal barrier films of Comparative Examples 1 to 7 are shown.

In Comparative Example 1, as compared to Example 1, zinc oxide particles having an average particle size of 3.8 μm (*F; Sakai Chemical Industry Co., Ltd.) were used. The evaluation results of the reflectance, temperature rise-reducing effect, and film thickness accuracy of the obtained thermal barrier film are shown in Table 9. The evaluation result of the reflectance was 78% and poor. In addition, the temperature rise-reducing effect was less than 15° C. (×) and was also poor. The evaluation result of the film thickness accuracy was within ±10 μm (○) and satisfactory.

In Comparative Example 2, as compared to Example 1, silicon having an average particle size of 5 μm (SIE23PB; Kojundo Chemical Laboratory Co., Ltd.) was used. The evaluation results of the reflectance, temperature rise-reducing effect, and film thickness accuracy of the obtained thermal barrier film are shown in Table 9. The evaluation result of the reflectance was 81% and poor. In addition, the temperature rise-reducing effect was less than 15° C. and was also poor. In addition, the evaluation result of the film thickness accuracy was within ±10 μm and satisfactory.

In Comparative Example 3, as compared to Example 1, titanium oxide having an average particle size of 1 μm (JR-1000; Tayca Corporation) was used. The evaluation results of the reflectance, temperature rise-reducing effect, and film thickness accuracy of the obtained thermal barrier film are shown in Table 9. The evaluation result of the reflectance was 85% and poor. In addition, the temperature rise-reducing effect was less than 15° C. and was also poor. In addition, the evaluation result of the film thickness accuracy was within ±10 μm and satisfactory.

In Comparative Example 4, as compared to Example 1, titanium oxide having an average particle size of 7 μm was used. The evaluation results of the reflectance, temperature rise-reducing effect, and film thickness accuracy of the obtained thermal barrier film are shown in Table 9. The evaluation result of the reflectance was 95% and satisfactory. In addition, the temperature rise-reducing effect was 15° C. or more and was also satisfactory. However, the evaluation result of the film thickness accuracy was ±16 μm or more and poor.

In Comparative Example 5, as compared to Example 1, titanium oxide adjusted by adding titanium oxide particles having an average particle size of 1 μm (JR-1000; Tayca Corporation) so that the ratio of particles having a particle size of 1.5 μm or less to all particles was 40 vol % was used. The evaluation results of the reflectance, temperature rise-reducing effect, and film thickness accuracy of the obtained thermal barrier film are shown in Table 9. The evaluation result of the reflectance was 93% and slightly poor. In addition, the temperature rise-reducing effect was 14° C. and was also slightly poor. In addition, the evaluation result of the film thickness accuracy was within ±10 μm and satisfactory.

In Comparative Example 6, as compared to Example 1, hollow particles were used to adjust the D-line refractive index to 1.30. The evaluation results of the reflectance, temperature rise-reducing effect, and film thickness accuracy of the obtained thermal barrier film are shown in Table 10. The evaluation result of the reflectance was 93% and slightly poor. In addition, the temperature rise-reducing effect was 14° C. and was also slightly poor. In addition, the evaluation result of the film thickness accuracy was within ±10 μm and satisfactory.

In Comparative Example 7, as compared to Example 1, a urethane resin was used so that the D-line refractive index became about 1.50. The evaluation results of the reflectance, temperature rise-reducing effect, and film thickness accuracy of the obtained thermal barrier film are shown in Table 10. The evaluation result of the reflectance was 87% and poor. In addition, the temperature rise-reducing effect was less than 15° C. and was also poor. In addition, the evaluation result of the film thickness accuracy was within ±10 μm and satisfactory.

TABLE 7

| | | | Comparative Example 1 | Comparative Example 2 | Comparative Example 3 | Comparative Example 4 | Comparative Example 5 |
|---|---|---|---|---|---|---|---|
| Thermal barrier film | Particle | Material | Zinc oxide (Sakai Chemical Industry Co., Ltd.) | Silicon | Titanium oxide | Titanium oxide | Titanium oxide |
| | | D-line refractive index | 2 | 4 | 2.72 | 2.72 | 2.72 |
| | | Average particle size (μm) | 3.8 | 5 | 1 | 7 | 2.25 |
| | | Ratio of particles having particle size of 1.5 μm or less (%) | 10 | 10 | 10 | 10 | 40 |
| | | Content (vol %) | 49 | 49 | 49 | 49 | 49 |
| | Resin | Material | Silicone | Silicone | Silicone | Silicone | Silicone |
| | | D-line refractive index | 1.39 | 1.39 | 1.39 | 1.39 | 1.39 |
| | | Content (vol %) | 33 | 33 | 33 | 33 | 33 |
| | Dispersant | Addition amount (vol %) | 2 | 2 | 2 | 2 | 2 |
| Method of forming thermal barrier film | Film thickness (μm) | | 40 | 40 | 40 | 40 | 40 |
| | Curing temperature (° C.) | | Room temperature | Room temperature | Room temperature | Room temperature | Room temperature |
| | Curing time (hour) | | 1 | 1 | 1 | 1 | 1 |

TABLE 8

| | | | Comparative Example 6 | Comparative Example 7 |
|---|---|---|---|---|
| Thermal barrier film | Particle | Material | Titanium oxide | Titanium oxide |
| | | D-line refractive index | 2.72 | 2.72 |
| | | Average particle size (μm) | 2.25 | 2.25 |
| | | Ratio of particles having particle size of 1.5 μm or less (%) | 10 | 10 |
| | | Content (vol %) | 49 | 49 |
| | Resin | Material | Silicone/ hollow particles | Urethane resin |
| | | D-line refractive index | 1.30 | 1.50 |
| | | Content (vol %) | 33 | 33 |
| | Dispersant | Addition amount (vol %) | 2 | 2 |
| Method of forming thermal barrier film | Film thickness (μm) | | 40 | 40 |
| | Curing temperature (° C.) | | Room temperature | Room temperature |
| | Curing time (hour) | | 1 | 1 |

TABLE 9

| | Thermal barrier film of Comparative Example 1 | Thermal barrier film of Comparative Example 2 | Thermal barrier film of Comparative Example 3 | Thermal barrier film of Comparative Example 4 | Thermal barrier film of Comparative Example 5 |
|---|---|---|---|---|---|
| Reflectance (%; 400 nm to 2,600 nm Ave.) | 78 | 81 | 85 | 95 | 93 |
| Temperature rise-reducing effect | x | x | x | ○ | x |
| Film thickness accuracy | ○ | ○ | ○ | x | ○ |

TABLE 10

| | Thermal barrier film of Comparative Example 6 | Thermal barrier film of Comparative Example 7 |
|---|---|---|
| Reflectance (%; 400 nm to 2,600 nm Ave.) | 93 | 87 |
| Temperature rise-reducing effect | x | x |
| Film thickness accuracy | ○ | ○ |

EXAMPLES 16 TO 28

Examples 16 to 28 were performed in the same manner as in Examples 1 to 15. However, for the reflectance, when having a reflectance of 90% or more, a thermal barrier film was evaluated as satisfactory. In addition, for the film thickness variation, when the film thickness variation was at an accuracy of within ±10 μm, the thermal barrier film was evaluated as satisfactory (○). When the film thickness variation is beyond ±10 μm, the positioning accuracy is degraded, and hence the film is difficult to use for an optical instrument (×).

Further, the pencil hardness of the thermal barrier film, which was not evaluated in Examples 1 to 15, was also evaluated. Now, an evaluation method for the pencil hardness is described. For a sample for pencil hardness evaluation, the thermal barrier film of the present invention was applied onto a metal plate of 30 mm square and 1 mm thick with a spray so as to have a desired film thickness, and was fired. For the pencil hardness, a thermal barrier film may be said to be satisfactory when having a pencil hardness of H or more. Accordingly, as a pencil for the test, Hi-uni H of Mitsubishi Pencil Co., Ltd. was used, and its lead was exposed perpendicularly with #400 sandpaper. The pencil was pressed at an angle of 45°, and moved over a distance of 10 mm through the application of a pressure of 10 N. The number of times of the test was set to 5, a thermal barrier film free of any flaw in all cases as evaluated as (○, pencil hardness: H or more), and a film in which a flaw or peeling was found was evaluated as (×, pencil hardness: less than H).

EXAMPLE 16

Preparation of Thermal Barrier Paint

In Example 16, a thermal barrier paint was produced by the following method. 210 g of titanium oxide (HT0210 (Toho Titanium Co., Ltd.; average particle size: 2 μm)), 35 g of an acrylic resin (ALMATEX 784 (Mitsui Chemicals, Inc.)), 100 g of hollow silica (Thrulya (JGC Corporation): 50% porosity), 2.4 g of a dispersant (DISPERBYK-180 (BYK Japan KK)), and 30 g of a solvent (butyl acetate) were weighed out, and stirred in a planetary rotation apparatus (Awatori Rentaro; Thinky Corporation) for 10 minutes to provide the thermal barrier paint of Example 16.

<Production of Thermal Barrier Film>

In Example 16, a thermal barrier film was produced by the following method using materials and conditions shown in Table 11. The above-mentioned thermal barrier paint was applied to each of the test piece for reflectance measurement, the test piece 17 for temperature evaluation, and the test piece for film thickness accuracy evaluation so as to have a film thickness of 40 μm, and cured at 130° C. for 1 hour to provide the thermal barrier film of Example 16.

EXAMPLES 17 TO 28

In Examples 17 to 28, thermal barrier films were produced in the same manner as in Example 16 except that materials and conditions shown in Tables 11 to 13 were used. For titanium oxide, hollow silica, and urethane acrylate, the same materials were used in all Examples and Comparative Examples.

Titanium oxide having an average particle size of 5 μm was produced by drying titanium oxide having a particle size of 80 nm in a rotary kiln at low temperature and then firing the resultant at a temperature of 1,100° C. for 2 hours, followed by pulverization. As particles having an average particle size of 1 μm, JR-1000 (Tayca Corporation) was used.

TABLE 11

| | | | | Thermal barrier film of Example 16 | Thermal barrier film of Example 17 | Thermal barrier film of Example 18 | Thermal barrier film of Example 19 | Thermal barrier film of Example 20 |
|---|---|---|---|---|---|---|---|---|
| Thermal barrier film | High-refractive-index particles | | Material | Titanium oxide | Titanium oxide | Titanium oxide | Titanium oxide | Titanium oxide |
| | | | D-line refractive index | 2.72 | 2.72 | 2.72 | 2.72 | 2.72 |
| | | | Average particle size (μm) | 2 | 2 | 2 | 2 | 2 |
| | | | Content (vol %) | 49 | 49 | 49 | 49 | 49 |
| | Resin matrix | Pore-containing particles | Material | Hollow silica | Hollow silica | Hollow silica | Hollow silica | Hollow silica |
| | | | Average particle size (nm) | 100 or less | 100 or less | 100 or less | 100 or less | 100 or less |
| | | | Content (vol %) | 20 | 20 | 20 | 20 | 35 |
| | | Resin | Material *Only the main material is shown. | Acrylic resin | Urethane resin | Epoxy resin | Urethane acrylate | Urethane acrylate |
| | | | Content (vol %) *Including the curing agent | 29 | 29 | 29 | 29 | 14 |

TABLE 11-continued

| | | | Thermal barrier film of Example 16 | Thermal barrier film of Example 17 | Thermal barrier film of Example 18 | Thermal barrier film of Example 19 | Thermal barrier film of Example 20 |
|---|---|---|---|---|---|---|---|
| | D-line refractive index | | 1.41 | 1.41 | 1.42 | 1.39 | 1.32 |
| | Dispersant | Addition amount (vol %) | 2 | 2 | 2 | 2 | 2 |
| Method of forming thermal barrier film | Film thickness (μm) | | 40 | 40 | 40 | 40 | 40 |
| | Curing temperature (° C.) | | 130 | 130 | 130 | 130 | 130 |
| | Curing time (hour) | | 1 | 1 | 1 | 1 | 1 |

TABLE 12

| | | | Thermal barrier film of Example 21 | Thermal barrier film of Example 22 | Thermal barrier film of Example 23 | Thermal barrier film of Example 24 | Thermal barrier film of Example 25 |
|---|---|---|---|---|---|---|---|
| Thermal barrier film | High-refractive-index particles | Material | Titanium oxide | Titanium oxide | Titanium oxide | Titanium oxide | Titanium oxide |
| | | D-line refractive index | 2.72 | 2.72 | 2.72 | 2.72 | 2.72 |
| | | Average particle size (μm) | 2 | 2 | 5 | 2/1 | 2 |
| | | Content (vol %) | 49 | 49 | 49 | 22/27 | 22 |
| Resin matrix | Pore-containing particles | Material | Hollow silica | Hollow silica | Hollow silica | Hollow silica | Hollow silica |
| | | Average particle size (nm) | 100 or less | 100 or less | 100 or less | 100 or less | 100 or less |
| | | Content (vol %) | 39 | 5 | 20 | 20 | 30 |
| | Resin | Material *Only the main material is shown. | Urethane acrylate | Urethane acrylate | Urethane acrylate | Urethane acrylate | Urethane acrylate |
| | | Content (vol %) *Including the curing agent | 10 | 44 | 29 | 29 | 46 |
| | D-line refractive index | | 1.30 | 1.48 | 1.39 | 1.39 | 1.39 |
| | Dispersant | Addition amount (vol %) | 2 | 2 | 2 | 2 | 2 |
| Method of forming thermal barrier film | Film thickness (μm) | | 40 | 40 | 40 | 40 | 40 |
| | Curing temperature (° C.) | | 130 | 130 | 130 | 130 | 130 |
| | Curing time (hour) | | 1 | 1 | 1 | 1 | 1 |

TABLE 13

| | | | Thermal barrier film of Example 26 | Thermal barrier film of Example 27 | Thermal barrier film of Example 28 |
|---|---|---|---|---|---|
| Thermal barrier film | High-refractive-index particles | Material | Titanium oxide | Titanium oxide | Titanium oxide |
| | | D-line refractive index | 2.72 | 2.72 | 2.72 |
| | | Average particle size (μm) | 2 | 2 | 2 |
| | | Content (vol %) | 59 | 20 | 60 |
| Resin matrix | Pore-containing particles | Material | Hollow silica | Hollow silica | Hollow silica |
| | | Average particle size (nm) | 100 or less | 100 or less | 100 or less |
| | | Content (vol %) | 16 | 32 | 15 |
| | Resin | Material *Only the main material is shown. | Urethane acrylate | Urethane acrylate | Urethane acrylate |
| | | Content (vol %) *Including the curing agent | 23 | 46 | 23 |

TABLE 13-continued

| | | Thermal barrier film of Example 26 | Thermal barrier film of Example 27 | Thermal barrier film of Example 28 |
|---|---|---|---|---|
| | D-line refractive index | 1.39 | 1.39 | 1.39 |
| | Dispersant Addition amount (vol %) | 2 | 2 | 2 |
| Method of forming thermal barrier film | Film thickness (μm) | 40 | 40 | 40 |
| | Curing temperature (° C.) | 130 | 130 | 130 |
| | Curing time (hour) | 1 | 1 | 1 |

<Evaluation Results>

The evaluation results of the reflectance and temperature rise-reducing effect of the thermal barrier film of each of Examples 16 to 28 by the above-mentioned methods are shown in Tables 14 to 16.

As a measurement result, the reflectance of the thermal barrier film is preferably 90% or more. In addition, the temperature rise-reducing effect is preferably a difference from the blank of 10° C. or more. In addition, the pencil hardness is preferably H or more. In addition, the film thickness accuracy is preferably within ±10 μm.

In Example 16, titanium oxide having an average particle size of 2 μm, an acrylic resin, and hollow silica were used, and the refractive index of a resin matrix formed of the acrylic resin and the hollow silica was adjusted to 1.41. The evaluation results of the reflectance, temperature rise-reducing effect, pencil hardness, and film thickness accuracy of the obtained thermal barrier film are shown in Table 14. The evaluation result of the reflectance was 97% and satisfactory. In addition, the temperature rise-reducing effect was 10° C. or more and satisfactory. In addition, the pencil hardness was H or more and satisfactory. In addition, the evaluation result of the film thickness accuracy was within ±10 μm and satisfactory.

In Example 17, as compared to Example 16, a urethane resin (ADEKA POLYETHER BPX-21 (Adeka Corporation)) was used. The evaluation results of the reflectance, temperature rise-reducing effect, pencil hardness, and film thickness accuracy of the obtained thermal barrier film are shown in Table 14. The evaluation result of the reflectance was 97% and satisfactory. In addition, the temperature rise-reducing effect was 10° C. or more and satisfactory. In addition, the pencil hardness was H or more and satisfactory. In addition, the evaluation result of the film thickness accuracy was within ±10 μm and satisfactory.

In Example 18, as compared to Example 16, an epoxy resin (iER828 (Mitsubishi Chemical Corporation)) was used. The evaluation results of the reflectance, temperature rise-reducing effect, pencil hardness, and film thickness accuracy of the obtained thermal barrier film are shown in Table 14. The evaluation result of the reflectance was 95% and satisfactory. In addition, the temperature rise-reducing effect was 10° C. or more and satisfactory. In addition, the pencil hardness was H or more and satisfactory. In addition, the evaluation result of the film thickness accuracy was within ±10 μm and satisfactory.

In Example 19, as compared to Example 16, urethane acrylate (OLESTER Q691 (Mitsubishi Chemical Corporation)) was used. The evaluation results of the reflectance, temperature rise-reducing effect, pencil hardness, and film thickness accuracy of the obtained thermal barrier film are shown in Table 14. The evaluation result of the reflectance was 98% and satisfactory. In addition, the temperature rise-reducing effect was 10° C. or more and satisfactory. In addition, the pencil hardness was H or more and satisfactory. In addition, the evaluation result of the film thickness accuracy was within ±10 μm and satisfactory.

In Example 20, as compared to Example 16, a thermal barrier film in which urethane acrylate (OLESTER Q691 (Mitsubishi Chemical Corporation)) was used and the D-line refractive index of the resin matrix was adjusted to 1.32 was used. The evaluation results of the reflectance, temperature rise-reducing effect, pencil hardness, and film thickness accuracy of the obtained thermal barrier film are shown in Table 14. The evaluation result of the reflectance was 94% and satisfactory. In addition, the temperature rise-reducing effect was 10° C. or more and satisfactory. In addition, the pencil hardness was H or more and satisfactory. In addition, the evaluation result of the film thickness accuracy was within ±10 μm and satisfactory.

In Example 21, as compared to Example 16, a thermal barrier film in which urethane acrylate (OLESTER Q691 (Mitsubishi Chemical Corporation)) was used and the D-line refractive index of the resin matrix was adjusted to 1.30 was used. The evaluation results of the reflectance, temperature rise-reducing effect, pencil hardness, and film thickness accuracy of the obtained thermal barrier film are shown in Table 15. The evaluation result of the reflectance was 94% and satisfactory. In addition, the temperature rise-reducing effect was 10° C. or more and satisfactory. In addition, the pencil hardness was H or more and satisfactory. In addition, the evaluation result of the film thickness accuracy was within ±10 μm and satisfactory. However, when the film thickness was set to 200 μm or more and a thermal shock was applied, film cracking occurred in some cases.

In Example 22, as compared to Example 16, a thermal barrier film in which urethane acrylate (OLESTER Q691 (Mitsubishi Chemical Corporation)) was used and the D-line refractive index of the resin matrix was adjusted to 1.48 was used. The evaluation results of the reflectance, temperature rise-reducing effect, pencil hardness, and film thickness accuracy of the obtained thermal barrier film are shown in Table 15. The evaluation result of the reflectance was 91% and slightly inferior, but was satisfactory. In addition, the temperature rise-reducing effect was 10° C. or more and satisfactory. In addition, the pencil hardness was H or more and satisfactory. In addition, the evaluation result of the film thickness accuracy was within ±10 μm and satisfactory.

In Example 23, as compared to Example 16, titanium oxide having an average particle size of 5 μm and urethane acrylate (OLESTER Q691 (Mitsubishi Chemical Corporation)) were used and the D-line refractive index of the resin matrix was adjusted to 1.39. The evaluation results of the reflectance, temperature rise-reducing effect, pencil hardness, and film thickness accuracy of the obtained thermal barrier film are shown in Table 15. The evaluation result of the reflectance was 95% and satisfactory. In addition, the temperature rise-reducing effect was 10° C. or more and satisfactory. In addition, the pencil hardness was H or more and satisfactory. In addition, although unevenness slightly occurred on the surface, the evaluation result of the film thickness accuracy was within ±10 μm and satisfactory.

In Example 24, as compared to Example 16, titanium oxide having an average particle size of 1 μm and titanium oxide having an average particle size of 2 μm were used in combination, urethane acrylate (OLESTER Q691 (Mitsubishi Chemical Corporation)) was used, and the D-line refractive index of the resin matrix was adjusted to 1.39. The evaluation results of the reflectance, temperature rise-reducing effect, pencil hardness, and film thickness accuracy of the obtained thermal barrier film are shown in Table 15. The evaluation result of the reflectance was 95% and satisfactory. In addition, the temperature rise-reducing effect was 10° C. or more and satisfactory. In addition, the pencil hardness was H or more and satisfactory. In addition, the evaluation result of the film thickness accuracy was within ±10 μm and satisfactory.

In Example 25, as compared to Example 16, the content of titanium oxide having an average particle size of 2 μm was adjusted to 22 vol %, urethane acrylate (OLESTER Q691 (Mitsubishi Chemical Corporation)) was used, and the D-line refractive index of the resin matrix was adjusted to 1.39. The evaluation results of the reflectance, temperature rise-reducing effect, pencil hardness, and film thickness accuracy of the obtained thermal barrier film are shown in Table 15. The evaluation result of the reflectance was 95% and satisfactory. In addition, the temperature rise-reducing effect was 10° C. or more and satisfactory. In addition, the pencil hardness was H or more and satisfactory. In addition, the evaluation result of the film thickness accuracy was within ±10 μm and satisfactory.

In Example 26, as compared to Example 16, the content of titanium oxide having an average particle size of 2 μm was adjusted to 59 vol %, urethane acrylate (OLESTER Q691 (Mitsubishi Chemical Corporation)) was used, and the D-line refractive index of the resin matrix was adjusted to 1.39. The evaluation results of the reflectance, temperature rise-reducing effect, pencil hardness, and film thickness accuracy of the obtained thermal barrier film are shown in Table 16. The evaluation result of the reflectance was 98% and satisfactory. In addition, the temperature rise-reducing effect was 10° C. or more and satisfactory. In addition, the pencil hardness was H or more and satisfactory. In addition, the evaluation result of the film thickness accuracy was within ±10 μm and satisfactory.

In Example 27, as compared to Example 16, the content of titanium oxide having an average particle size of 2 μm was adjusted to 20 vol %, urethane acrylate (OLESTER Q691 (Mitsubishi Chemical Corporation)) was used, and the D-line refractive index of the resin matrix was adjusted to 1.39. The evaluation results of the reflectance, temperature rise-reducing effect, pencil hardness, and film thickness accuracy of the obtained thermal barrier film are shown in Table 16. The evaluation result of the reflectance was 94% and satisfactory. In addition, the temperature rise-reducing effect was 10° C. or more and satisfactory. In addition, the pencil hardness was H or more and satisfactory. In addition, the evaluation result of the film thickness accuracy was within ±10 μm and satisfactory.

In Example 28, as compared to Example 16, the content of titanium oxide having an average particle size of 2 μm was adjusted to 60 vol %, urethane acrylate (OLESTER Q691 (Mitsubishi Chemical Corporation)) was used, and the D-line refractive index of the resin matrix was adjusted to 1.39. The evaluation results of the reflectance, temperature rise-reducing effect, pencil hardness, and film thickness accuracy of the obtained thermal barrier film are shown in Table 16. The evaluation result of the reflectance was 98% and satisfactory. In addition, the temperature rise-reducing effect was 10° C. or more and satisfactory. In addition, the pencil hardness was H or more and satisfactory. In addition, the evaluation result of the film thickness accuracy was ±10 μm or less and satisfactory. However, when the film thickness was set to 200 μm or more and a thermal shock was applied, film cracking occurred owing to a large inorganic pigment content of titanium oxide in some cases.

TABLE 14

| | Thermal barrier film of Example 16 | Thermal barrier film of Example 17 | Thermal barrier film of Example 18 | Thermal barrier film of Example 19 | Thermal barrier film of Example 20 |
|---|---|---|---|---|---|
| Reflectance (%; 400 nm to 2,600 nm Ave.) | 97 | 97 | 95 | 98 | 94 |
| Temperature rise-reducing effect | ○ | ○ | ○ | ○ | ○ |
| Pencil hardness | ○ | ○ | ○ | ○ | ○ |
| Film thickness accuracy | ○ | ○ | ○ | ○ | ○ |

TABLE 15

| | Thermal barrier film of Example 21 | Thermal barrier film of Example 22 | Thermal barrier film of Example 23 | Thermal barrier film of Example 24 | Thermal barrier film of Example 25 |
|---|---|---|---|---|---|
| Reflectance (%; 400 nm to 2,600 nm Ave.) | 94 | 91 | 95 | 95 | 95 |
| Temperature rise-reducing effect | ○ | ○ | ○ | ○ | ○ |

TABLE 15-continued

| | Thermal barrier film of Example 21 | Thermal barrier film of Example 22 | Thermal barrier film of Example 23 | Thermal barrier film of Example 24 | Thermal barrier film of Example 25 |
|---|---|---|---|---|---|
| Pencil hardness | ○ | ○ | ○ | ○ | ○ |
| Film thickness accuracy | ○ | ○ | ○ | ○ | ○ |

TABLE 16

| | Thermal barrier film of Example 26 | Thermal barrier film of Example 27 | Thermal barrier film of Example 28 |
|---|---|---|---|
| Reflectance (%; 400 nm to 2,600 nm Ave.) | 98 | 94 | 98 |
| Temperature rise-reducing effect | ○ | ○ | ○ |
| Pencil hardness | ○ | ○ | ○ |
| Film thickness accuracy | ○ | ○ | ○ |

Comparative Examples 8 to 14

The preparation of thermal barrier paints for comparison, the production of thermal barrier films, the evaluation of reflectances, the evaluation of temperature rise-reducing effects, the evaluation of film thickness accuracies, and the evaluation of pencil hardnesses were performed in the same manner as in Examples 16 to 28 described above. Differences from Examples 16 to 28 are described below.

As a fluorine-based resin, any one of poly(2,2,3,3-tetrafluoropropyl methacrylate) (Sigma-Aldrich Co. LLC), poly(2,2,3,3-tetrafluoropropyl acrylate) (Sigma-Aldrich Co. LLC), poly(2,2,2-trifluoroethyl methacrylate) (Sigma-Aldrich Co. LLC), and ZEFFLE (Daikin Industries, Ltd.) may be used. As zinc oxide, zinc oxide particles #F having an average particle size of 3.8 μm (Sakai Chemical Industry Co., Ltd.) were used. As silicon particles, silicon SIE23PB having an average particle size of 5 μm (Kojundo Chemical Laboratory Co., Ltd.) was used.

Titanium oxide having an average particle size of 7 μm was produced by drying titanium oxide having a particle size of 80 nm in a rotary kiln at low temperature and then firing the resultant at a temperature of 1,100° C. for 2 hours, followed by pulverization. As hollow particles having an average particle size of 100 nm or more, cross-linked styrene acrylic hollow particles (primary particle size: 300 nm; Adachi New Industrial Companies) were used.

In Tables 17 and 18, materials for the thermal barrier films of Comparative Examples 8 to 14 and their addition amounts are shown. In addition, in Tables 19 and 20, evaluation results obtained using the thermal barrier films of Comparative Examples 8 to 14 are shown.

In Comparative Example 8, as compared to Example 16, a fluorine resin having a low coating film hardness (ZEFFLE (Daikin Industries, Ltd.)) was used. The evaluation results of the reflectance, temperature rise-reducing effect, pencil hardness, and film thickness accuracy of the obtained thermal barrier film are shown in Table 19. The evaluation result of the reflectance was 95% and satisfactory. In addition, the temperature rise-reducing effect was 10° C. or more and satisfactory. The pencil hardness was less than H and the hardness was insufficient. In addition, the evaluation result of the film thickness accuracy was within ±10 μm and satisfactory.

In Comparative Example 9, as compared to Example 16, titanium oxide having a particle size as small as an average particle size of 1 μm was used. The evaluation results of the reflectance, temperature rise-reducing effect, pencil hardness, and film thickness accuracy of the obtained thermal barrier film are shown in Table 19. The evaluation result of the reflectance was 83% and the reflectance was less than 90%. In addition, the temperature rise-reducing effect was less than 10° C. and the effect was low. The pencil hardness was H or more and satisfactory. In addition, the evaluation result of the film thickness accuracy was within ±10 μm and satisfactory.

In Comparative Example 10, as compared to Example 16, zinc oxide having a refractive index as low as a D-line refractive index of 2 was used. The evaluation results of the reflectance, temperature rise-reducing effect, pencil hardness, and film thickness accuracy of the obtained thermal barrier film are shown in Table 19. The evaluation result of the reflectance was 78% and the reflectance was less than 90%. In addition, the temperature rise-reducing effect was less than 10° C. and the effect was low. The pencil hardness was H or more and satisfactory. In addition, the evaluation result of the film thickness accuracy was within ±10 μm and satisfactory.

In Comparative Example 11, as compared to Example 16, silicon having a refractive index as high as a D-line refractive index of 4 was used. The evaluation results of the reflectance, temperature rise-reducing effect, pencil hardness, and film thickness accuracy of the obtained thermal barrier film are shown in Table 19. The evaluation result of the reflectance was 75% and the reflectance was less than 90%. In addition, the temperature rise-reducing effect was less than 10° C. and the effect was low. The pencil hardness was H or more and satisfactory. In addition, the evaluation result of the film thickness accuracy was within ±10 μm and satisfactory.

In Comparative Example 12, as compared to Example 16, titanium oxide having a particle size as large as an average particle size of 7 μm was used. The evaluation results of the reflectance, temperature rise-reducing effect, pencil hardness, and film thickness accuracy of the obtained thermal barrier film are shown in Table 19. The evaluation result of the reflectance was 94% and satisfactory. In addition, the temperature rise-reducing effect was 10° C. or more and satisfactory. The pencil hardness was H or more and satisfactory. However, the evaluation result of the film thickness accuracy was beyond ±10 μm and poor.

In Comparative Example 13, as compared to Example 16, hollow particles having an average particle size of 100 nm or more (cross-linked styrene acrylic hollow particles (primary particle size: 300 nm; Adachi New Industrial Companies)) were used. The evaluation results of the reflectance, temperature rise-reducing effect, pencil hardness, and film thickness accuracy of the obtained thermal barrier film are shown in Table 20. The evaluation result of the reflectance was 88% and the reflectance was less than 90%. In addition, the temperature rise-reducing effect was less than 10° C. and the effect was low. The pencil hardness was H or more and satisfactory. In addition, the evaluation result of the film thickness accuracy was less than ±10 μm and satisfactory.

In Comparative Example 14, as compared to Example 16, solid particles were used as particles having an average particle size of 100 nm or less. The evaluation results of the reflectance, temperature rise-reducing effect, pencil hardness, and film thickness accuracy of the obtained thermal barrier film are shown in Table 20. The evaluation result of the reflectance was 83% and the reflectance was less than 90%. In addition, the temperature rise-reducing effect was less than 10° C. and the effect was low. The pencil hardness was H or more and satisfactory. In addition, the evaluation result of the film thickness accuracy was within ±10 μm and satisfactory.

TABLE 17

| | | | | Thermal barrier film of Comparative Example 8 | Thermal barrier film of Comparative Example 9 | Thermal barrier film of Comparative Example 10 | Thermal barrier film of Comparative Example 11 | Thermal barrier film of Comparative Example 12 |
|---|---|---|---|---|---|---|---|---|
| Thermal barrier film | High-refractive-index particles | | Material | Titanium oxide | Titanium oxide | Zinc oxide | Silicon | Titanium oxide |
| | | | D-line refractive index | 2.72 | 2.72 | 2 | 4 | 2.72 |
| | | | Average particle size (μm) | 2 | 1 | 2 | 4 | 7 |
| | | | Addition amount (vol %) | 49 | 49 | 49 | 49 | 49 |
| | Resin matrix | Pore-containing particles | Material | Hollow silica | Hollow silica | Hollow silica | Hollow silica | Hollow silica |
| | | | Average particle size (nm) | 100 or less | 100 or less | 100 or less | 100 or less | 100 or less |
| | | | Addition amount (vol %) | 20 | 20 | 20 | 20 | 20 |
| | | Resin | Material *Only the main material is shown. | Fluorine-based resin | Urethane acrylate | Urethane acrylate | Urethane acrylate | Urethane acrylate |
| | | | Additional amount (vol %) *Including the curing agent | 29 | 29 | 29 | 29 | 29 |
| | | D-line refractive index | | 1.33 | 1.39 | 1.39 | 1.39 | 1.39 |
| | | Dispersant | Addition amount (vol %) | 2 | 2 | 2 | 2 | 2 |
| Method of forming thermal barrier film | Film thickness (μm) | | | 40 | 40 | 40 | 40 | 40 |
| | Curing temperature (° C.) | | | 130 | 130 | 130 | 130 | 130 |
| | Curing time (hour) | | | 1 | 1 | 1 | 1 | 1 |

TABLE 18

| | | | | Thermal barrier film of Comparative Example 13 | Thermal barrier film of Comparative Example 14 |
|---|---|---|---|---|---|
| Thermal barrier film | High-refractive-index particles | | Material | Titanium oxide | Titanium oxide |
| | | | D-line refractive index | 2.72 | 2.72 |
| | | | Average particle size (μm) | 2 | 2 |
| | | | Addition amount (vol %) | 49 | 49 |
| | Resin matrix | Pore-containing particles | Material | Cross-linked styrene acrylic hollow particles | Solid silica |
| | | | Average particle size (nm) | 100 or more | 100 or less |
| | | | Addition amount (vol %) | 20 | 20 |
| | | Resin | Material *Only the main material is shown. | Urethane acrylate | Urethane acrylate |
| | | | Addition amount (vol %) *Including the curing agent | 29 | 29 |

TABLE 18-continued

| | | Thermal barrier film of Comparative Example 13 | Thermal barrier film of Comparative Example 14 |
|---|---|---|---|
| Method of forming thermal barrier film | D-line refractive index | 1.39 | 1.5 |
| | Dispersant Addition amount (vol %) | 2 | 2 |
| | Film thickness (μm) | 40 | 40 |
| | Curing temperature (° C.) | 130 | 130 |
| | Curing time (hour) | 1 | 1 |

TABLE 19

| | Thermal barrier film of Comparative Example 8 | Thermal barrier film of Comparative Example 9 | Thermal barrier film of Comparative Example 10 | Thermal barrier film of Comparative Example 11 | Thermal barrier film of Comparative Example 12 |
|---|---|---|---|---|---|
| Reflectance (%; 400 nm to 2,600 nm Ave.) | 95 | 83 | 78 | 75 | 94 |
| Temperature rise-reducing effect | ○ | x | x | x | ○ |
| Pencil hardness | x | ○ | ○ | ○ | ○ |
| Film thickness accuracy | ○ | ○ | ○ | ○ | x |

TABLE 20

| | Thermal barrier film of Comparative Example 13 | Thermal barrier film of Comparative Example 14 |
|---|---|---|
| Reflectance (%; 400 nm to 2,600 nm Ave.) | 88 | 83 |
| Temperature rise-reducing effect | x | x |
| Pencil hardness | ○ | ○ |
| Film thickness accuracy | ○ | ○ |

The thermal barrier film of the present invention can be utilized for an optical instrument and precision equipment to be used outdoors. Examples of the optical instrument and the precision equipment to be used outdoors include general cameras and video cameras, surveillance cameras and weather cameras for business use, and broadcast equipment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-082672, filed Apr. 18, 2016, and Japanese Patent Application No. 2016-086144, filed Apr. 22, 2016, which are hereby incorporated by reference herein in their entirety.

What is claimed is:

1. An optical instrument, comprising a lens barrel including a lens on an inside thereof, wherein the lens barrel has a thermal barrier film on at least part of an outermost peripheral surface thereof for reflecting sunlight, and wherein the thermal barrier film contains: first particles having a D-line refractive index of 2.5 to 3.2 and an average particle size of 2.0 μm to 5.0 μm; and a resin having a D-line refractive index of 1.32 to 1.42.

2. The optical instrument according to claim 1, wherein the first particles comprise titanium oxide particles.

3. The optical instrument according to claim 1, wherein the thermal barrier film contains 20 vol% to 60 vol% of the first particles.

4. The optical instrument according to claim 1, wherein the thermal barrier film has an average film thickness of 10 μm to 70 μm.

5. The optical instrument according to claim 1, wherein the first particles contain 35 mass% or less of particles having a particle size of 1.5 μm or less.

6. The optical instrument according to claim 1, wherein the thermal barrier film has an average reflectance of 94% or more for light having a wavelength of from 400 nm to 2,600 nm, the light entering the thermal barrier film at an angle of incidence of 5°.

7. A thermal barrier film, comprising:

first particles having a D-line refractive index of 2.5 to 3.2 and an average particle size of 2.0 μm to 5.0 μm; and a resin having a D-line refractive index of 1.32 to 1.42.

8. The thermal barrier film according to claim 7, wherein the first particles comprise titanium oxide particles.

9. The thermal barrier film according to claim 7, wherein the thermal barrier film contains 20 vol% to 60 vol% of the first particles.

10. The thermal barrier film according to claim 7, wherein the thermal barrier film has an average film thickness of 10 μm to 70 μm.

11. The thermal barrier film according to claim 7, wherein the first particles contain 35 mass% or less of particles having a particle size of 1.5 μm or less.

12. The thermal barrier film according to claim 11, wherein the thermal barrier film has an average reflectance of 94% or more for light having a wavelength of from 400 nm to 2,600 nm, the light entering the thermal barrier film at an angle of incidence of 5°.

13. A thermal barrier paint, comprising:

first particles having a D-line refractive index of 2.5 to 3.2 and an average particle size of 2.0 μm to 5.0 μm;

a resin; and a solvent, wherein the resin has a D-line refractive index of 1.32 to 1.42.

* * * * *